UNITED STATES PATENT OFFICE.

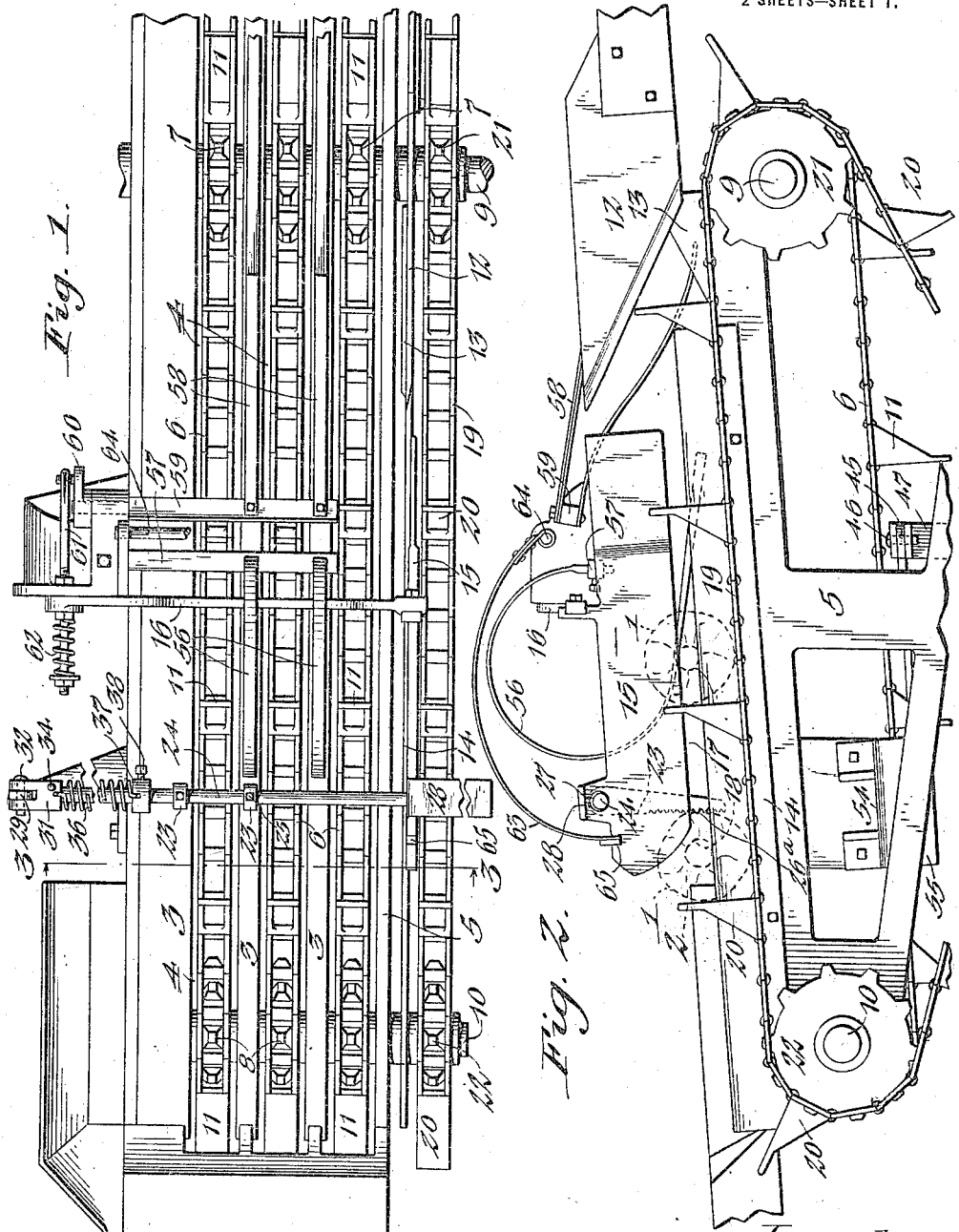

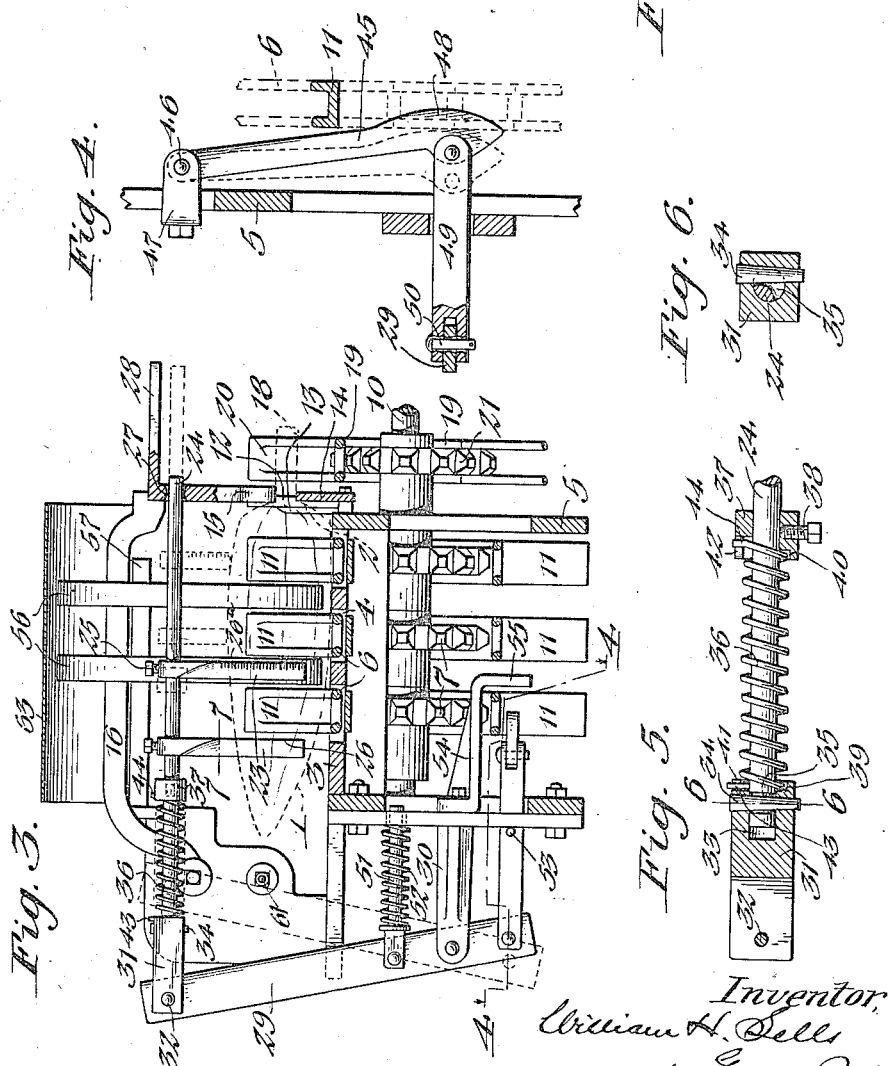

WILLIAM H. SELLS, OF BUFFALO, NEW YORK.

BUTT-REMOVER FOR CORN-HUSKING MACHINES.

1,280,317.  Specification of Letters Patent.  Patented Oct. 1, 1918.

Application filed April 5, 1917. Serial No. 159,974.

*To all whom it may concern:*

Be it known that I, WILLIAM H. SELLS, a citizen of the United States, residing at Buffalo, in the county of Erie and State of New York, have invented new and useful Improvements in Butt-Removers for Corn-Husking Machines, of which the following is a specification.

The object of this invention is to provide a butt remover for corn husking machines which is simple and durable in construction and which is reliable and efficient in operation for positioning the ears of corn on the conveyer preparatory to presenting the butt ends of the ears to the butt cutter.

In the accompanying drawings:

Figure 1 is a top plan view of a butt remover for corn husking machines provided with the preferred embodiment of my invention. Fig. 2 is a side elevation of the same. Fig. 3 is a vertical transverse section thereof taken on line 3—3, Fig. 1. Fig. 4 is a fragmentary horizontal section taken on the correspondingly numbered line in Fig. 3. Fig. 5 is a fragmentary longitudinal section of the shifting rod or shaft and the parts connected therewith. Fig. 6 is a vertical section on line 6—6, Fig. 5. Fig. 7 is a fragmentary horizontal section, on an enlarged scale, taken on line 7—7, Fig. 3.

Similar characters of reference indicate corresponding parts throughout the several views.

The ears 1 of corn which are to be cut off at their butt ends 2 are placed by the attendant upon a feed table which preferably comprises a plurality of longitudinal bars 3 separated from each other by longitudinal slots 4, said bars being mounted in any suitable manner on the main frame 5 of the machine. The ears of corn while arranged in a crosswise position relatively to the length of the table are moved forward bodily lengthwise of the same by means of a conveyer which may be variously constructed but preferably comprises an endless carrier having a plurality of main chain belts 6 the upper stretches of which move forwardly in the longitudinal slots between the bars 3 of the feed table while their lower stretches move backwardly underneath the same. The front and rear turns of these main belts pass around front and rear sprocket wheels 7 and 8 which are mounted on front and rear horizontal shafts 9, 10 journaled transversely in suitable bearings on the front and rear parts of the main frame. These belts may be operated in any suitable manner, for instance by applying power to either the front shaft 9 or the rear shaft 10. Each of the main belts is provided at intervals with feeding wings or fingers 11, the corresponding wings of the several main belts being arranged transversely in line, so that together they form a set and operate simultaneously upon an ear of corn by engaging with the rear side of the same.

Adjacent to one side of the ear conveyer, for instance the right hand side, as shown in Figs. 1–3, is arranged a butt cutter against which the butt ends of the ears of corn are moved by the conveyer for the purpose of removing these butt ends. This butt cutter may be of various forms, that shown in the drawings being preferred and comprising upper and lower blades 12, 13 which are so mounted on the main frame that their cutting edges converged toward the front end of the machine and are arranged in the path of the butt ends of the ears of corn as the latter are moved forwardly by the conveyer.

Preparatory to reaching the butt cutter the ears of corn are shifted transversely relatively to the feed table and conveyer and engage at their butt ends with a gage which operates to determine the amount of material which is to be cut off from the butt ends of the ears. This gage in the present instance is arranged lengthwise of the right hand side of the upper stretch of the conveyer and outside of the cutting line of the butt cutter equal in distance to the amount of material which is to be removed from the butt ends of the ears of corn. In its preferred form this gage comprises a lower longitudinal gage bar 14 which is secured to the right hand side of the main frame and an upper longitudinal gage bar 15 arranged above the lower gage bar and supported by means of an overhanging bracket 16 from the opposite side of the main frame. The upper and lower gage bars are separated from each other by an intervening longitudinal slot 17 which is in line with the point of intersection, or substantially so, between the upper and lower blades of the butt cutter. In the operation of the machine the butt ends of the ears of corn are adapted to engage with their upper and lower parts against the upper and lower gage bars while the stubs 18 of these ears project laterally through the slot between the same so that these stubs do not interfere with the operation of gaging the ears preparatory to cutting off butts.

In order to insure carrying the butt ends of the ears of corn rearwardly past the cutter and prevent the ears from being shifted into an oblique position on the conveyer during the cutting operation an auxiliary conveyer is provided which in this instance comprises an auxiliary conveyer belt 19 arranged with its upper stretch lengthwise adjacent to the outer side of the lower gage bar and provided with a plurality of feed wings or fingers 20 each of which comes in line with one set of the wings or fingers on the main belts and is adapted to engage with the butt ends of the ears of corn while the latter are passing over the feed table and past the gage and cutter. This auxiliary conveyer belt passes with its front and rear turns around front and rear sprocket wheels 21, 22 mounted on the right hand ends of the front and rear shafts 9, 10, so that this belt operates in unison with the main conveyer belts.

The improved ear position device which forms the subject of the present invention and whereby the ears of corn are shifted bodily transversely relatively to the feed table, conveyer and cutter so that their butt ends engage with the gage preparatory to trimming off these butt ends is preferably constructed as follows:

Above the path of the ears of corn are arranged one or more shifting arms 23 of which two are shown in Figs. 1 and 3 although this number may be varied as desired. These shifting arms are mounted so as to be capable of a vertically swinging motion in a plane lengthwise of the conveyer and also capable of reciprocating bodily in a direction transversely of the conveyer so that each ear of corn upon being moved forwardly on the conveyer will engage with these arms and be thereby shifted laterally against the gage. These shifting arms are arranged transversely in line and secured at their upper ends to a shifting rod or member 24 arranged horizontally and transversely above the path of the ears of corn, the connection between the shifting arms and the shifting rod being preferably effected by providing each of these arms at its upper end with an opening which receives the shifting rod and a set screw 25 whereby this arm may be secured in the proper place to said rod. Normally these shifting arms project downwardly from the shifting rod in a substantially vertical or pendant position and into the path of the ears of corn so that when the latter are moved forwardly by the conveyer the front sides of the ears engage with the rear sides of the shifting arms and then raise the latter into a more or less inclined position depending upon the thickness or diameter of the ear of corn, and while the shifting arms thus engage with an ear these arms are moved transversely relatively to the conveyer and thereby cause the ear to be shifted laterally with its butt end against the gage. In order to enable the shifting arms to obtain a firm grip upon the ears of corn for insuring a reliable shifting of the same against the gage the rear side of each of these arms is provided with a gripping surface. For this purpose each of the shifting arms has its lower rear engaging part preferably constructed of triangular form so as to form a comparatively sharp rear corner or knife edge 26, as shown in Fig. 7, which corner enables this arm to obtain a firm hold on the ear of corn and positively shift the same against the gage. This grip of the shifting arm may be further increased in effectiveness by providing the sharp edge of the same with a plurality of notches $26^a$, as shown in Figs. 2 and 3, whereby this edge is serrated and is enabled to dig into the ears of corn a sufficient extent to effectively move the ears of corn transversely toward the gage.

Various means may be provided for operating the shifting rod and its arms, those shown in the drawings having been found satisfactory in actual practice and therefore preferred. As there shown these means are constructed as follows:

27 represents a guide opening arranged in the upper part of the upper gage bar and loosely receiving the right hand end of the shifting rod so that the latter is capable of sliding lengthwise in this opening and also tilting therein the required extent. Above this opening the upper gage bar is provided with a laterally projecting guard bar 28 which extends outwardly from the machine to any extent at least equal to the limit of the outward movement of the shifting rod so as to prevent any one standing near the machine from receiving a push and suffering injury. At its left hand end the shifting rod is connected by means of a swivel connection with the upper arm of a vertically and transversely swinging actuating lever 29 which is mounted to rock between its upper and lower arms on a bracket 30 projecting laterally from the adjacent part of the left hand side of the main frame. This swivel connection preferably comprises a head or block 31 which is pivoted at its outer end by means of a horizontal longitudinal pin 32 with the upper end of the rock lever 29 and provided at its inner end with a horizontal bearing or socket 33 in which the left hand end of the guide rod is journaled so as to be capable of turning therein. This turning movement of the shifting rod in the swivel head is limited by a stop device to about one-quarter of a circle, the stop device for this purpose preferably comprising a pin 34 extending through the inner part of the swivel head and through the segmental slot 35 formed in the periphery of the shifting rod, as shown in Figs. 5 and 6, whereby this pin also serves as a means for preventing the shifting rod from being withdrawn from the swivel head. After an ear of corn has engaged the rear sides of the shifting arms and lifted the same during the gaging operation and then passed forwardly a sufficient extent to clear these arms, then the latter swing rearwardly again into their pendant position preparatory to intercepting the next following ear and repeating the gaging operation thereon. Instead of depending solely upon gravity to return the shifting arms from their elevated position to their lower pendant position it is preferable to supplement this action by means of a spring device so as to cause the shifting arms to return promptly into the path of the ears of corn and thus insure reliable gaging of the same. A suitable spring device for this purpose is shown in the drawings and comprises a helical spring 36 surrounding the left hand end of the shifting rod and secured at its opposite ends respectively with the swivel head 31 and a collar 37 which is attached to the shifting rod by means of a set screw 38. The connection between the spring 36 and this head and collar is of such a character that the tension of the spring tends constantly to turn the shifting rod and the shifting arms mounted thereon so as to depress the shifting arms into their pendant position. As shown in the drawings this connection between this spring and the head and collar is effected by providing the opposing faces of this head and collar with annular recesses or sockets 39, 40 around the shifting rod in which the end or extreme coils of this spring are seated, and notches 41, 42 extending from these recesses to the outer sides of said head and collar and receiving the extreme ends 43, 44 of this spring, whereby these spring ends are interlocked with said head and collar, as shown in Fig. 5. By loosening the set screw 38 of the collar and turning the same on the shifting rod the tension upon this spring may be varied as required to produce the desired action upon the shifting arms for returning the same from the elevated position to the depressed position. The connection between this spring and the swivel head and collar is by this means accomplished in a simple and effective manner and one which is not liable to get out of order.

The oscillating movement of the actuating rock lever 29 may be produced by various means but preferably by motion derived directly from the backwardly moving lower stretch of one of the chain belts of the main conveyer. As shown in the drawings this mechanism for operating this rock lever is constructed as follows:

45 represents a horizontally swinging cam or tappet lever which is pivoted at its front end by means of a vertical pin 46 to a bracket 47 arranged on the left hand side of the main frame and having its rear end constructed in the form of a cam 48 which is arranged adjacent to the outer side of the outermost chain belt on the left hand side of the machine so that the same projects into the path of the feed wings or fingers of this chain belt. The free end of this cam lever, is connected by means of a link 49 with the lower arm of the actuating rock lever by means of a horizontal longitudinal pin 50, this connection between this link and the rock lever being sufficiently loose to permit these parts to work freely notwithstanding that the rock lever and cam lever swing in different planes. The rock lever is yieldingly moved in a direction in which the shifting rod is moved from right to left and the cam or tappet lever is moved into the path of the feed wings on the respective belt of the conveyer, these means being shown in Fig. 3 and comprising a guide rod 51 pivoted at its outer end to the upper arm of the rock lever and sliding at its inner end in an opening in the main frame, and a spring 52 surrounding this guide rod and bearing at one end against a shoulder at the outer end of this rod while its inner end bears against the main frame. As each feed wing of the respective chain belt engages with the cam or tappet lever and deflects the same laterally the shifting rod and the arms mounted thereon are shifted toward the gage together with an ear of corn which at that time may be in engagement with these shifting arms, and when the respective feed wing clears the cam lever the latter is again moved across the path of the next following feed wing by the spring 52 and the shifting bar or rod is returned to its extreme position to the left of the machine. This return movement of these parts is preferably limited by a stop 53 arranged on the link 49 and engaging the outer side of the main frame, as shown in Fig. 3. The relative movements of these parts is so timed that the shifting arms move toward the right past the front faces of feeding wings of one set on the conveyer and then remain in their position farthest to the right and out of the path of these wings while the latter pass the shifting arms. After the respective feed wings pass the shifting arms the latter return behind these wings to their position farthest to the left where they are again out of the path of these wings and then remain at rest in this position until the proper time for movement toward the right immediately in advance of the next following set of feed wings for engaging an ear of corn which may be propelled thereby. By this means these shifting arms always engage an ear of corn which may be present in front of a forwardly moving set of feeding wings and shift the same against the gage preparatory to cutting the same, but if no ear is present in front of a set of feed wings then the shifting arms simply move idly relatively to the respective set of wings.

In order to hold the carrying chain at the left of the conveyer in position while a feed wing on this belt is engaging with this lever a retaining arm 54 is provided which is secured to the adjacent part of the main frame and provided with a retaining finger 55 arranged vertically adjacent to the right hand side of the chain belt or opposite to the cam lever, as shown in Fig. 3, thereby preventing deflection of the chain belt when engaged by the cam or tappet lever.

As the ears of corn are about to clear the free ends of the shifting arms during their forward movement the same pass underneath the lower end of a plurality of primary retaining springs 56 which are of leaf shape and operate to hold the same downwardly upon the feed table and in engagement with the feeding wings and the gage. These springs are preferably secured at their upper ends to a transverse bar 57 which is fixed on the adjacent part of the main frame. As the ears of corn during their forward movement clear the front ends of the primary retaining springs the same engage with the undersides of a plurality of secondary retaining springs 58 of leaf form which are arranged over the feed table and which operate to hold the ears of corn properly on the conveyer so that the butt ends of the ears are not displaced while the butts thereof are being removed by the cutter. These secondary springs are preferably mounted at their upper ends on a horizontal transverse shaft 59 journaled in a bearing on the main frame, which shaft is yieldingly turned in a direction for holding the secondary springs in a depressed position by means of a crank 60 secured to the left hand end of the spring shaft 59, a pull rod 61 connected at one end with the free end of the crank and passing through an opening in the adjacent part of the main frame, and a spring 62 surrounding the pull rod and bearing at its opposite ends against the main frame and a shoulder on the pull rod so that this spring operates constantly to hold the secondary springs yieldingly in a depressed position.

By this means the ears of corn are under control from the time that they are deposited upon the rear end of the feed table to the time that they are discharged from the front end of the table after the butts have been removed therefrom.

The attendant is prevented from reaching into the machine from above the ear positioning device by means of a guard 63 pivoted at its front end by means of a transverse rod 64 to the main frame while its rear end is removably seated in a notch 65 in the upper side of the upper gage bar.

This positioning device adapts itself to ears of varying sizes and gages the same equally well. The same is reliable in its action, it requires but little power for its operation, and it positions the corn without injuring the same.

I claim as my invention:

1. A butt-remover for corn husking machines comprising a conveyer for propelling ears of corn in a crosswise position relatively to the direction of movement of the conveyer, a gage arranged at one side of the conveyer, a cutter arranged on a line between said conveyer and gage, and an ear positioning device comprising a shifting arm arranged above the conveyer and capable of swinging vertically and reciprocating transversely relatively to said conveyer and adapted to engage with the ears of corn and move the same against said gage.

2. A butt-remover for corn husking machines comprising a conveyer for propelling ears of corn in a crosswise position relatively to the direction of movement of the conveyer, a gage arranged at one side of the conveyer, a cutter arranged on a line between said conveyer and gage, and an ear positioning device comprising a shifting member arranged above the conveyer and reciprocable transversely relatively to the conveyer, and a shifting arm mounted on said member and adapted to project downwardly from said member into the path of the ears of corn and to be moved forwardly and upwardly by the latter when engaged by the same.

3. A butt-remover for corn husking machines comprising a conveyer for propelling ears of corn in a crosswise position relatively to the direction of movement of the conveyer, a gage arranged at one side of the conveyer, a cutter arranged on a line between said conveyer and gage, and an ear positioning device comprising a shifting member arranged above the conveyer and reciprocable transversely relatively to the conveyer, a shifting arm mounted on said member and adapted to project downwardly from said member into the path of the ears of corn and to be moved forwardly and upwardly by the latter when engaged by the same, and means for holding said arm yieldingly in a depressed position.

4. A butt-remover for corn husking machines comprising a conveyer for propelling ears of corn in a crosswise position relatively to the direction of movement of the conveyer, a gage arranged at one side of the conveyer, a cutter arranged on a line between said conveyer and gage, and an ear positioning device comprising a shifting arm arranged above the conveyer and capable of swinging vertically and reciprocating transversely relatively to said conveyer and adapted to engage with the ears of corn and move the same against said gage, said shifting arm being provided with a comparatively sharp edge on its rear side which is adapted to engage with the ears of corn.

5. A butt-remover for corn husking machines comprising a conveyer for propelling ears of corn in a crosswise position relatively to the direction of movement of the conveyer, a gage arranged at one side of the conveyer, a cutter arranged on a line between said conveyer and gage, and an ear positioning device comprising a shifting arm arranged above the conveyer and capable of swinging vertically and reciprocating transversely relatively to said conveyer and adapted to engage with the ears of corn and move the same against said gage, said shifting arm being provided on its rear side with a sharp edge and notches in said edge for engagement with the ears of corn propelled by said conveyer.

6. A butt-remover for corn husking machines comprising a conveyer for propelling ears of corn in a crosswise position relatively to the direction of movement of the conveyer, a gage arranged at one side of the conveyer, a cutter arranged on a line between said conveyer and gage, and an ear positioning device comprising a shifting member arranged above the path of said conveyer and reciprocable transversely relatively thereto and also capable of rocking on a horizontal axis, a shifting arm mounted on said shifting member and adapted to be engaged by the ears of corn which are propelled by said conveyer, an actuating member, and a swiveling connection between said actuating member and said shifting member.

7. A butt-remover for corn husking machines comprising a conveyer for propelling ears of corn in a crosswise position relatively to the direction of movement of the conveyer, a gage arranged at one side of the conveyer, a cutter arranged on a line between said conveyer and gage, and an ear positioning device comprising a shifting member arranged above the path of said conveyer and reciprocable transversely relatively thereto and also capable of rocking on a horizontal axis, a shifting arm mounted on said shifting member and adapted to be engaged by the ears of corn which are propelled by said conveyer, an actuating member, and a swiveling connection between said actuating member and said shifting member comprising a head connected by a horizontal longitudinal pivot with said actuating member and provided with a bearing in which said shifting member is capable of turning but held against lengthwise movement.

8. A butt-remover for corn husking machines comprising a conveyer for propelling ears of corn in a crosswise position relatively to the direction of movement of the conveyer, a gage arranged at one side of the conveyer, a cutter arranged on a line between said conveyer and gage, and an ear positioning device comprising a shifting member arranged above the path of said conveyer and reciprocable transversely relatively thereto and also capable of rocking on a horizontal axis, a shifting arm mounted on said shifting member and adapted to be engaged by the ears of corn which are propelled by said conveyer, an actuating member, and a swiveling connection between said actuating member and said shifting member comprising a head connected by a horizontal longitudinal pivot with said actuating member and provided with a bearing in which said shifting member is capable of turning but held against lengthwise movement, said shifting member being provided on its periphery and within said head with a segmental groove, and a pin mounted on said head and projecting into said groove.

9. A butt-remover for corn husking machines comprising a conveyer for propelling ears of corn in a crosswise position relatively to the direction of movement of the conveyer, a gage arranged at one side of the conveyer, a cutter arranged on a line between said conveyer and gage, and an ear positioning device comprising a shifting member arranged above the path of said conveyer and reciprocable transversely relatively thereto and also capable of rocking on a horizontal axis, a shifting arm mounted on said shifting member and adapted to be engaged by the ears of corn which are propelled by said conveyer, an actuating member, a head connected with said actuating member and provided with a bearing in which said shifting member is capable of turning but is held against lengthwise movement and also provided in its end with a socket and a notch extending outwardly from said socket, a collar secured to said shifting member, and a spring surrounding said shifting member and seated with the terminal coils in said sockets of said head and collar and having its ends arranged in said notches.

10. A butt-remover for corn husking machines comprising a cutter for removing the butts of the ears of corn, a gage arranged in advance of said cutter, an endless conveyer having upper and lower stretches and feed wings which engage with the ears of corn on the upper stretch of the conveyer and carry the same past said gage and cutter, and an ear positioning device which is adapted to engage the ears while on the upper stretch of the conveyer and shift the same transversely toward said gage and which is actuated by the feed wings on the lower stretch of the conveyer.

11. A butt-remover for corn husking machines comprising a cutter for removing the butts of the ears of corn, a gage arranged in advance of said cutter, an endless conveyer having upper and lower stretches and feed wings which engage with the ears of corn on the upper stretch of the conveyer and carry the same past said gage and cutter, and an ear positioning device which is adapted to engage the ears while on the upper stretch of the conveyer and shift the same transversely toward said gage and which is actuated by the feed wings on the lower stretch of the conveyer comprising shifting members arranged above the path of the ears and to engage the same and a tappet operatively connected with said shifting member and adapted to be operated by the wings on the lower stretch of said conveyer.

12. A butt-remover for corn husking machines comprising a cutter for removing the butts of the ears of corn, a gage arranged in advance of said cutter, an endless conveyer having upper and lower stretches and feed wings which engage with the ears of corn on the upper stretch of the conveyer and carry the same past said gage and cutter, and an ear positioning device which is adapted to engage the ears while on the upper stretch of the conveyer and shift the same transversely toward said gage and which is actuated by the feed wings on the lower stretch of the conveyer comprising a transversely movable shifting member arranged above the conveyer and adapted to engage with the ears of corn, an actuating rock lever having its upper arm operatively connected with said shifting member, a tappet lever operatively connected with the lower arm of said actuating lever, and a spring operating to move said actuating lever and hold said tappet lever yieldingly in the path of the wings on the lower stretch of said conveyer.

13. A butt-remover for corn husking machines comprising a cutter for removing the butts of the ears of corn, a gage arranged in advance of said cutter, an endless conveyer having upper and lower stretches and feed wings which engage with the ears of corn on the upper stretch of the conveyer and carry the same past said gage and cutter, and an ear positioning device which is adapted to engage the ears while on the upper stretch of the conveyer and shift the same transversely toward said gage and which is actuated by the feed wings on the lower stretch of the conveyer comprising a transversely movable shifting member arranged above the conveyer and adapted to engage with the ears of corn, an actuating rock lever having its upper arm operatively connected with said shifting member, a tappet lever operatively connected with the lower arm of said actuating lever, a spring operating to move said actuating lever and hold said tappet lever yieldingly in the path of the wings on the lower stretch of said conveyer and a retaining arm adapted to be engaged by that side of the lower stretch of said conveyer opposite to said tappet lever.

14. A butt-remover for corn husking machines comprising a cutter for removing the butts of the ears of corn, a gage arranged in advance of said cutter, an endless conveyer having upper and lower stretches and feed wings which engage with the ears of corn on the upper stretch of the conveyer and carry the same past said gage and cutter, and an ear positioning device which is adapted to engage the ears while on the upper stretch of the conveyer and shift the same transversely toward said gage and which is actuated by the feed wings on the lower stretch of the conveyer comprising a transversely movable shifting member arranged above the conveyer and adapted to engage with the ears of corn, an actuating rock lever having its upper arm operatively connected with said shifting member, a tappet lever arranged to be engaged by the wings on the lower stretch of said conveyer, a link connecting said tappet lever with the lower arm of said actuating lever, a guide rod connected with said actuating lever, and a spring interposed between a shoulder on said rod and a relatively fixed part of the machine and operating to move said shifting member and associated parts in a direction opposite to that in which they are moved when said tappet lever is engaged by said wings.

WILLIAM H. SELLS.

Copies of this patent may be obtained for five cents each, by addressing the "Commissioner of Patents, Washington, D. C."